(12) United States Patent
Granston et al.

(10) Patent No.: US 6,754,893 B2
(45) Date of Patent: Jun. 22, 2004

(54) METHOD FOR COLLAPSING THE PROLOG AND EPILOG OF SOFTWARE PIPELINED LOOPS

(75) Inventors: Elana D. Granston, Sugar Land, TX (US); Joseph Zbiciak, North Richland Hills, TX (US); Alan S. Ward, Sugar Land, TX (US); Eric J. Stotzer, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 624 days.

(21) Appl. No.: 09/732,257

(22) Filed: Dec. 7, 2000

(65) Prior Publication Data

US 2002/0112228 A1 Aug. 15, 2002

Related U.S. Application Data

(60) Provisional application No. 60/173,502, filed on Dec. 29, 1999.

(51) Int. Cl.$^7$ .................................................. G06F 9/45
(52) U.S. Cl. ........................................................ 717/161
(58) Field of Search ................................ 717/151–161; 712/234–241

(56) References Cited

U.S. PATENT DOCUMENTS 5,835,776 A * 11/1998 Tirumalai et al. ........... 717/161
6,289,443 B1 * 9/2001 Scales et al. ................ 712/241

OTHER PUBLICATIONS

Schlansker et al., "Achieving High Levels of Instructions-Level Parallelism with Reduced Hardware Complexity", Nov. 1994, HPL–96–120, www.hpl.hp.com/techreports/96/HPL–96–120.pdf.*
Rau et al., "Code Generation Schema for Modulo Scheduled Loops", ACM Proceedings of the 25th annual International Symposium on Microarchitecture, Dec. 1992, vol. 23, iss. 1–2.*

* cited by examiner

Primary Examiner—Kakali Chaki
Assistant Examiner—Tuan A Vu
(74) Attorney, Agent, or Firm—W. James Brady, III; Frederick J. Telecky, Jr.

(57) ABSTRACT

A method for reducing a code size of a software pipelined loop, the software pipelined loop having a kernel and an epilog. The method includes first evaluating a stage of the epilog. This includes selecting a stage of the epilog to evaluate (504) and evaluating an instruction in a reference stage. This includes identifying an instruction in the reference stage that is not present in the selected stage of the epilog (506) and determining if the identified instruction can be speculated (508). If the identified instruction can be speculated, such is noted. If the instruction cannot be speculated, it is determined whether the identified instruction can be predicated (512). If the instruction can be predicated, it is marked as needing predication (514). Next, it is determined if another instruction in the reference stage is not present in the selected stage of the epilog (510). If there is, the instruction evaluation is repeated. If there is another stage of the epilog to evaluate, the evaluation is repeated (518).

12 Claims, 4 Drawing Sheets

METHOD FOR COLLAPSING THE PROLOG AND EPILOG OF SOFTWARE PIPELINED LOOPS

This application claims priority under 35 USC 119(e)(1) of provisional application No. 60/173,502, filed Dec. 29, 1999.

BACKGROUND OF INVENTION

1. Field of the Invention

This invention relates to the field of Optimizing Compilers for computer systems; specifically, it relates to a method for collapsing the prolog and epilog of software pipelined loops.

2. Description of the Related Art

Software pipelining is key to achieving good performance software architectures that support Instruction Level Parallelism (ILP architectures), which are generally architectures that are capable of issuing parallel instructions. Instructions may be considered to be "parallel operations" if their operations overlap in time, such as when an instruction has delay slots.

Software pipelining improves loop performance by exposing and exploiting instruction-level parallelism between consecutive loop iterations. For example, a loop body may consist of three instructions (ins1, ins2, and ins3), a decrement, and a conditional branch back to the beginning. In the absence of software pipelining and assuming dependence constraints are met, a possible "schedule" for this code on a VLIW processor might be as follows:

```
loop:   ins1
        ins2    ||   dec n        ; n = n−1
        ins3    ||   [n] br loop  ; branch to loop iff n>0
```

(Note: The || operator denotes instructions that execute in parallel).
In this schedule, very little parallelism has been exploited because instructions "ins1," "ins2," and "ins3" must execute in order within a given loop iteration.

Software pipelining overlaps multiple consecutive iterations of the loop to improve throughput, and therefore performance. For instance, assuming that all dependence constraints are met, a possible pipelined version of the loop in the example above might look as follows:

```
loop:     sub n, 2, n                        ; exec. kernel n-2 times
          ins1                               ; prolog stage 1
          ins2 || ins1 || dec n              ; prolog stage 2
          ;----------------------------------
kernel:   ins3 || ins2 || ins1 || [n] dec n || [n] br kernel
          ;----------------------------------
                   || ins3     || ins2        ; epilog stage 1
                               || ins3        ; epilog stage 2
```

In the pipelined code above, the 3 cycle loop becomes a 1 cycle loop by parallelizing 3 consecutive iterations of the loop. The kernel of the loop acts as a pipeline, processing one "stage" of each of the iterations in parallel. The pipeline is primed and drained through the "prolog" and "epilog" code that surrounds the kernel.

In general, all prolog, epilog, and kernel stages consist of II cycles, where II is the "initiation interval." In the example above, II=1. In other cases, II might be greater than 1.

In some cases, each stage may consist of multiple cycles. For instance, a kernel may be more than one cycle in length. For example, this may be due to hardware restrictions, such as the need to perform three multiplication operations when there are only two multipliers available. To accomplish this, two multiplications would be performed in parallel in one cycle of the kernel, and the third multiplication would be performed in the other cycle.

The kernel size may also be increased because of loop carried data dependencies in the loop being software pipelined. Future loop iterations cannot start until the current iteration completes the computation of a result required by the future iteration.

SUMMARY OF THE INVENTION

Therefore, a need has arisen for a system and method for collapsing the prolog and the epilog of software pipelined loops.

In accordance with one embodiment of the present invention, software-based techniques which reduce code expansion by rolling some or all of the prolog and/or epilog back into kernel are applied. This may be accomplished via "prolog collapsing" and "epilog collapsing."

According to one embodiment of the present invention, a method for reducing the code size of a software pipelined loop having a prolog, a kernel, and an epilog is disclosed. This method involves the collapsing of an epilog and/or a prolog. Stages are processed inside-out—that is, starting with the stage closest to the kernel, and working out from the kernel. A stage can be collapsed (i.e., rolled into the kernel) if instructions that are present in either a previous stage, or in the kernel, can be either speculated or predicated. If a stage is encountered that cannot be completely collapsed, the process is complete.

According to another embodiment of the present invention, a method for reducing a code size of a software pipelined loop having a kernel, an epilog, and optionally, a prolog includes the following steps. The stages of the epilog may be evaluated inside-out. Instructions that are present in a reference stage, which may be the kernel or a previously evaluated stage of the epilog, but not in the selected stage, are evaluated. If the identified instructions can be speculated, they are noted as capable of being speculated. If the instructions are not capable of being speculated, it is determined if the instructions can be predicated. If the instructions can be predicated, they are marked as capable of being predicated. If instructions cannot be speculated or predicated, the stage cannot be collapsed. The method is repeated for all stages of the epilog until the epilog cannot be collapsed.

According to another embodiment of the present invention, a method for reducing a code size of a software pipelined loop having a prolog, a kernel, and, optionally, an epilog ,includes the following steps. The stages of the prolog may be evaluated inside-out. Instructions that are present in a reference stage, which may be the kernel or a previously evaluated stage of the prolog, but not in the selected stage, are evaluated. If the identified instructions can be speculated, they are noted as capable of being speculated. If the instructions are not capable of being speculated, it is determined if the instructions can be predicated. If the instructions can be predicated, they are marked as capable of being predicated. If instructions cannot be speculated or predicated, the stage cannot be collapsed. The method is repeated for all stages of the prolog until the prolog cannot be collapsed.

According to another embodiment of the present invention, a method for reducing a code size of a software pipelined loop having a prolog and a kernel, and, optionally, an epilog, the kernel having a plurality of cycles, includes the following steps. Stages may be processed from the inside-out. The innermost unprocessed cycle of a candidate stage is identified, and instructions that are present in a reference stage, which may be the kernel or a previously evaluated stage of the prolog, but not in the identified stage, are evaluated. If the identified instructions can be speculated, they are noted as capable of being speculated. If the instructions are not capable of being speculated, it is determined if the instructions can be predicated. If the instructions can be predicated, they are marked as capable of being predicated. If instructions cannot be speculated or predicated, the stage cannot be completely collapsed. The method is repeated for all cycles of all stages of the prolog until the prolog cannot be completely collapsed.

Consider the cycle on which the process got stuck. This becomes the current cycle. If this is not the innermost cycle of the current stage, it is determined whether a branch can be inserted. If so, the candidate stage is partially collapsed. If not, the next innermost cycle becomes the current cycle. The process is repeated until a branch can be inserted and a stage can be partially collapsed or an innermost cycle of a current stage is encountered.

A technical advantage of the present invention is that a method for collapsing the prolog and epilog of software pipelined loops is disclosed. Another technical advantage of the present invention is that code size is reduced. Another technical advantage of the present invention is that the method of the present invention makes code more efficient.

DESCRIPTION OF PREFERRED EMBODIMENTS

Figure 1:
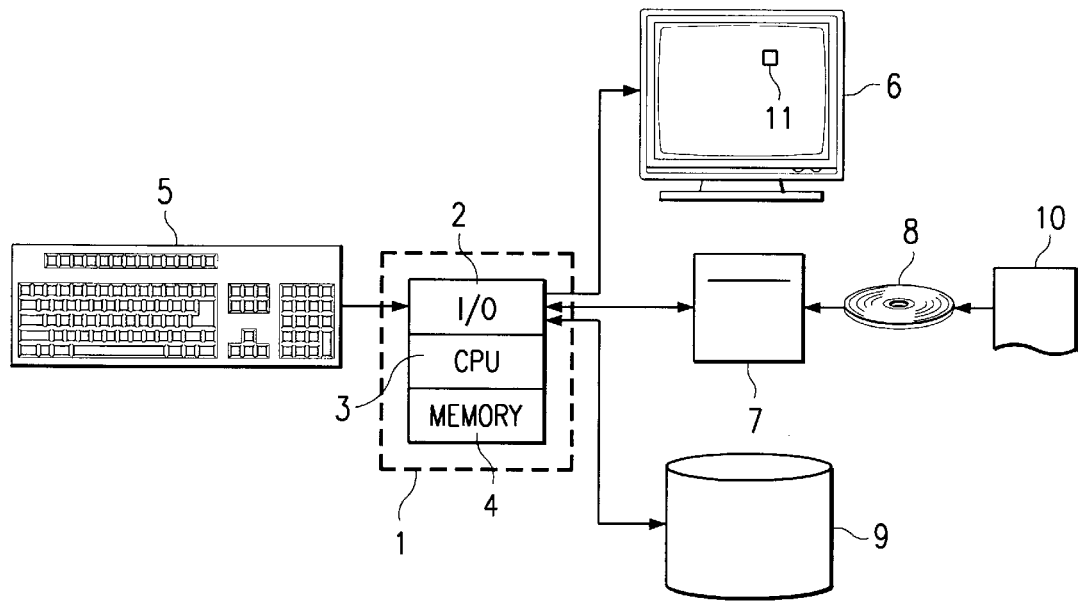
FIG. 1 illustrates a portion of a computer, including a CPU and conventional memory in which the presentation may be embodied.

Embodiments of the present invention and their technical advantages may be better understood by referring to FIGS. 1 though 7, like numerals referring to like and corresponding parts of the various drawings.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9 and a CD-ROM drive unit 7. The CD-ROM unit 7 can read a CD-ROM medium 8, which typically contains programs and data 10.

Figure 2:
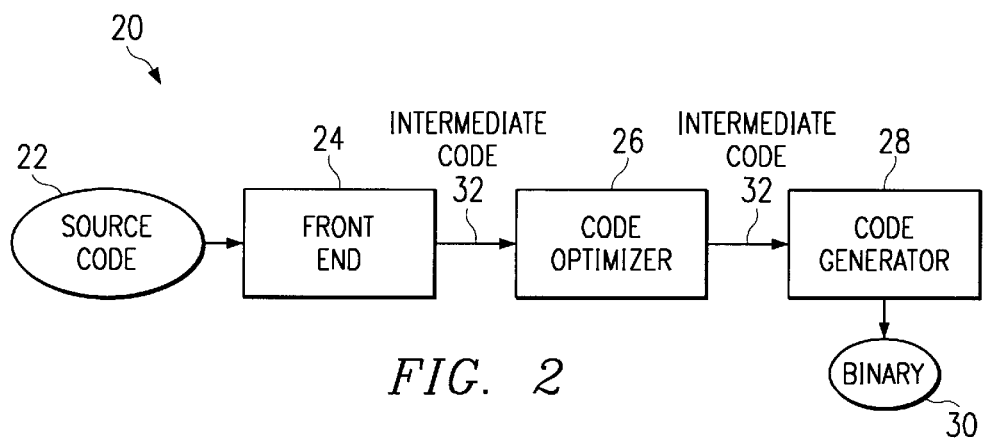
FIG. 2 illustrates a typical compiler showing the position of the code optimizer.

FIG. 2 illustrates a typical optimizing compiler 20, comprising a front end compiler 24, a code optimizer 26, and a back end code generator 28. Front end compiler 24 takes, as input, program 22 written in a source language, and performs various lexical, syntactical and semantic analysis on this language, outputting an intermediate set of code 32, representing the target program. Intermediate code 32 is used as input to code optimizer 26, which attempts to improve the intermediate code so that faster-running machine (binary) code 30 results. Some code optimizers 26 are trivial, and others do a variety of optimizations in an attempt to produce the most efficient target program possible. Those of the latter type are called "optimizing compilers," and include such code transformations as common sub-expression elimination, dead-code elimination, renaming of temporary variables, and interchange of two independent adjacent statements as well as register allocation.

Figure 3:
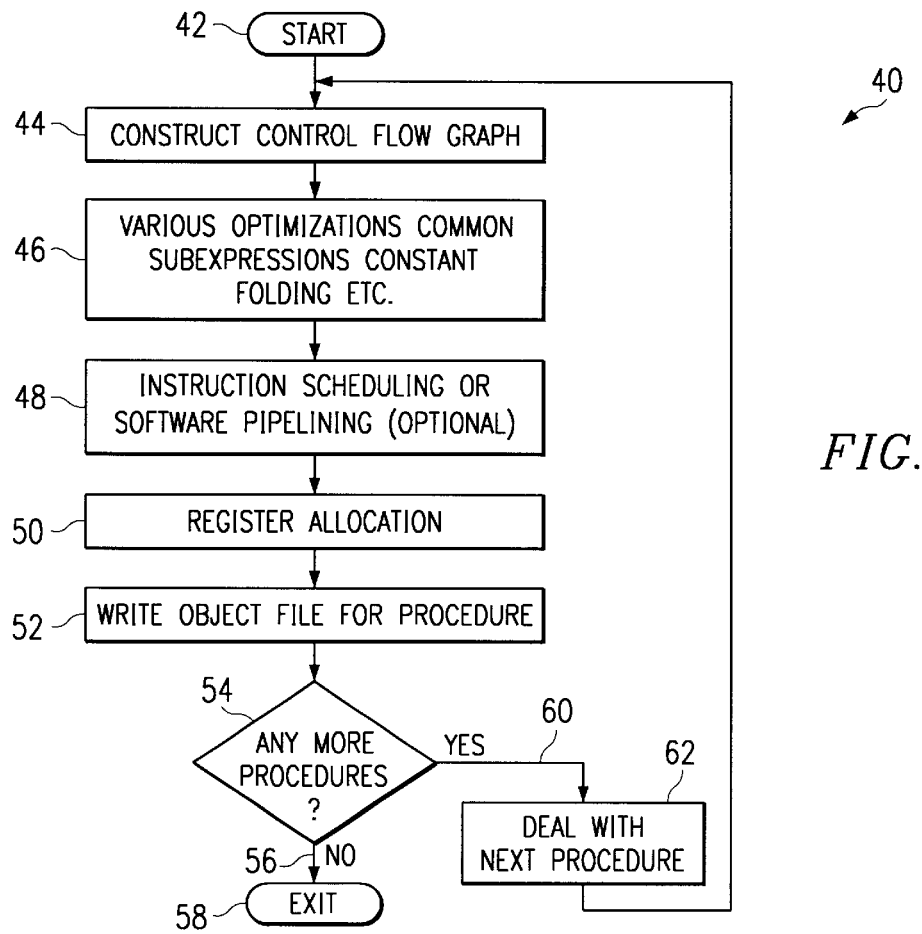
FIG. 3 illustrates a large scale organization of a code optimizer.

FIG. 3 depicts a typical organization of an optimizing compiler 40. On entry of intermediate code 42, control flow graph 44 is constructed. At this stage, the aforementioned code transformations 46 (common sub-expression elimination, dead-code elimination, renaming of temporary variables, and interchange of two independent adjacent statements, etc.) take place. Next, instruction scheduling, or "pipelining," 48 may take place. Then "register allocation" 50 is performed and the modified code is written out 52 for the compiler back end to convert to the binary language of the target machine.

Modulo scheduling has its origins in the development of pipelined hardware functional units. As discussed above, the rate at which new loop iterations are started is called the Initiation Interval or Iteration Interval (II). The Minimum Iteration Interval (MII) is the lower bound on the II determined by the resource and data dependency constraints. The resource bound (ResMII) is determined by the total resource requirements of the operations in the loop. The recurrence count (RecMII) is determined by loop carried data dependencies. The MII is thus determined as MAX(ResMII, RecMII).

In modulo scheduling, the schedule for a single loop iteration is divided into a sequence of stages with a length of II cycles. In the steady state of the execution of the software pipeline, each of the stages will be executing in parallel. The instruction schedule for a software pipelined loop has three components: a prolog, a kernel, and an epilog. The kernel is the instruction schedule that will execute the steady state. In the kernel, an instruction scheduled at cycle k will execute in parallel with all instructions scheduled at cycle k Modulo II. The prologs and epilogs are the instruction schedules that respectively set up and drain the execution of the loop kernel.

Figure 4:
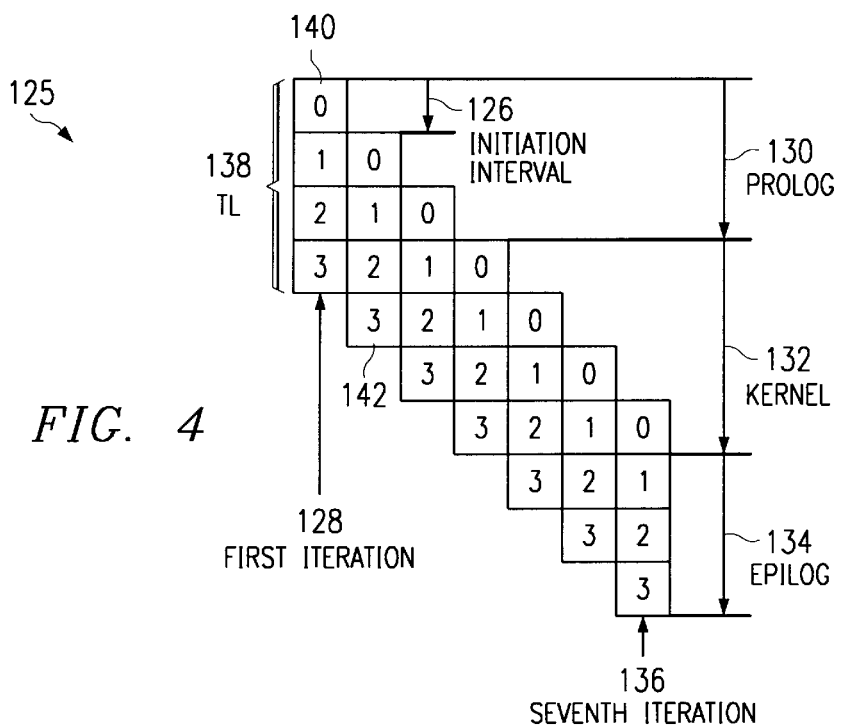
FIG. 4 illustrates a four stage seven iteration pipeline.

The key principles of modulo scheduling are as follows. Parallel instruction processing is obtained by starting an iteration before the previous iteration has completed. The basic idea is to initiate new iterations after fixed time intervals (II). FIG. 4 shows the execution of seven iterations of a pipelined loop. The scheduled length (TL) of a single iteration is TL 138, and it is divided into stages each of length II 126. The stage count (SC) is defined as, SC=[TL/

II], or, in this case, TL=4 (138 in FIG. 4) and II=1 126, and so SC=[4/1]=4. Loop execution begins with stage 0 140 of the first iteration 128. During the first II cycles, no other iteration executes concurrently. After the first II cycles, the first iteration 128 enters stage 1, and the second iteration 142 enters stage 0.

New iterations begin every II cycles until a state is reached when all stages of different iterations are executing. Toward the end of loop execution, no new iterations are initiated, and those that are in various stages of progress gradually complete.

These three phases of loop execution are termed prolog 130, kernel 132 and epilog 134. During prolog 130 and epilog 134, not all stages of successive iterations execute. This happens only during kernel phase 132. Prolog 130 and epilog 134 last for (SC-1)×II cycles. If the trip count of the loop is large (that is, if the loop is of the type where 10 iterations of the loop are required), kernel phase 132 will last much longer than prolog 130 or epilog 134. The primary performance metric for a modulo scheduled loop is the II, 126. II is a measure of the steady state throughput for loop iterations. Smaller II values imply higher throughput. Therefore, the scheduler attempts to derive a schedule that minimizes the II. The time to execute n iterations is T(n)=(n+SC-1)×II. The throughput approaches II as n approaches infinity.

The code in the prolog and epilog is identical to portions of the code in the kernel, with some stages of the pipeline missing. During each prolog stage, a new iteration begins, but no iterations finish. During each execution of the kernel body, one iteration completes and a new one is started. During each epilog stage, an iteration completes, but no new iteration is started. By the end of the epilog, the last iteration is complete.

Because the code in the prolog and epilog is an exact copy of portions of the kernel, it may be possible to eliminate all or part of the prolog and epilog code. In some machines, special hardware can selectively suppress kernel instructions to provide exact prologs and epilogs without requiring the prologs and epilogs to be provided explicitly; however, not all processors provide this luxury.

Without special purpose hardware, there are two inherent problems with software pipelining. First, the software pipelining optimization can cause significant code expansion, which is an especially serious problem with embedded code. In particular, the code expansion comes from the prolog and the epilog.

Second, to be eligible for the software-pipelining optimization, a loop must be known at compile-time to execute at least SC iterations. If the compiler does not know that the trip count, n, is at least SC, it must generate multi-version code, increasing code size and decreasing performance.

Without this information, the compiler must either suppress software pipelining of the loop, or rely on multi-version code generation (i.e., generate two versions within the user code and use a run-time check based on trip-count to choose between them) as shown in the sample user code below:

```
if (n>=SC)
    pipelined version
else
    original version
endif
```

Thus, multi-version code generation increases code size, and adds runtime overhead.

The present invention is directed to software-based techniques which reduce code expansion by rolling some or all of the prolog and/or epilog back into kernel. This may be accomplished via a combination of speculative execution (executing instructions before it is known whether they would have been executed in the untransformed instruction stream), predication (conditional instruction nullification), and code bypassing. These prolog and epilog removal techniques are referred to as "prolog collapsing" and "epilog collapsing," respectively.

Figure 5:
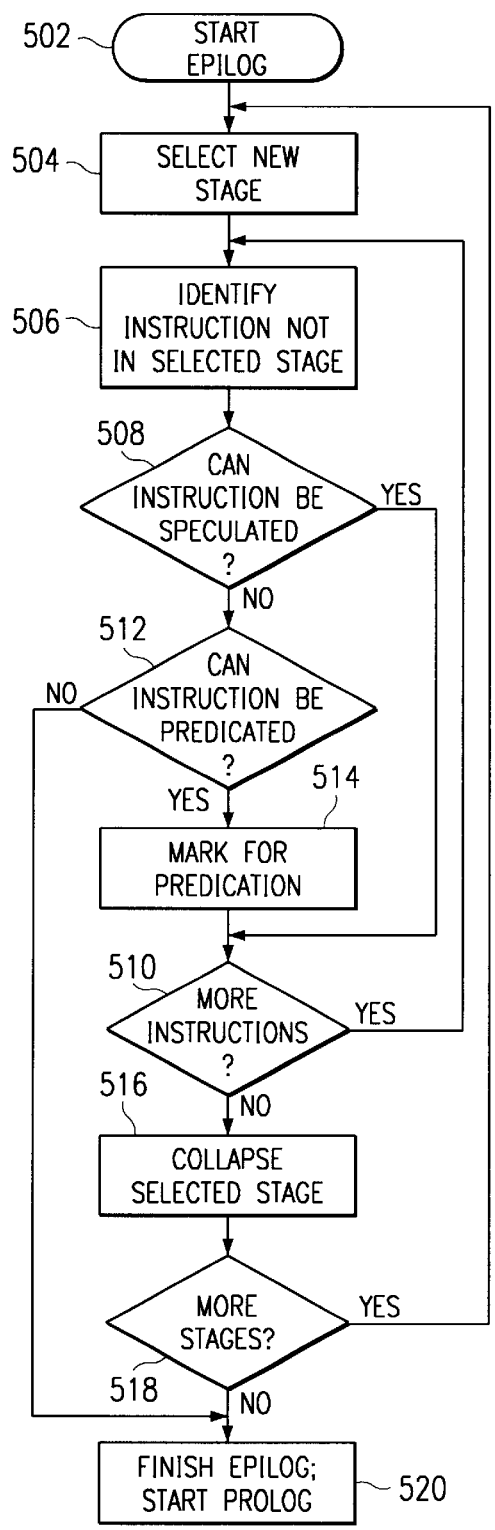
FIG. 5 is a block diagram of the system for collapsing the prolog and epilog of software pipelined loops according to one embodiment of the present invention.

Referring to FIG. 5, a flowchart depicting the method for collapsing a software pipelined loop according to one embodiment of the present invention is provided. In step 502, the system evaluates the epilog first. According to another embodiment of the present invention, the prolog may be evaluated first. Other techniques and orders of evaluation may be used.

In step 504, the system selects a new stage of the epilog to evaluate. In one embodiment, this stage is the stage that is closest to the kernel (i.e., the stage right after the kernel). Thus, in this embodiment, the system works from the "inside-out," starting with the stage closest to the kernel, and working outward.

In step 506, the system identifies an instruction in a reference stage that is not in the selected epilog stage. In one embodiment, the reference stage is the kernel. In another embodiment, the reference stage is a previously evaluated stage.

In step 508, the system determines if the identified instruction can be speculated. If the instruction can be speculated, in step 510, it is determined if there are more instructions that are not in the selected epilog stage. If there are, the system identifies the next instruction in step 506.

If, in step 508, the system determines that the instruction cannot be speculated, in step 512, it determines if the instruction can be predicated.

To predicate one or more instructions in the selected stage, the following conditions should be met. First, there should be at least one unused register that is available for use as a predicate register. Second, the instruction should be unpredicated. Third, there should be a slot available for another decrement instruction. Fourth, there should be a place available in the schedule to place the instructions that decrement a predicate register.

In another embodiment, the instruction may be predicated even though it already has a predicate. This may be accomplished by modifying the predicate on the instruction, such that the guard is the logical AND of the original predicate, and the predicate, which guards against overexecution. On some architectures, this might require that one or more additional instructions be inserted into the kernel.

In step 514, the instruction is marked for predication.

If the instruction cannot be predicated, then epilog cannot be collapsed further, and epilog collapsing is complete.

In step 518, the system determines if any stages remain in the epilog. If stages remain, a new stage is selected and evaluated in step 504. If there are no stages remaining, the epilog collapsing is complete.

The stages of the epilog are collapsed in step 516. This may be done when the system determines that there are no more instructions to evaluate in a selected stage, or it may be done after the system determines that the epilog cannot be further collapsed.

After collapsing the epilog, the system may move to collapse the prolog of the software pipelined loop. The process for collapsing the prolog may be very similar to the process for collapsing the epilog. According to one embodiment, the system starts with the prolog stage that is the "closest" to the kernel and then works outward. In this aspect, the prolog collapsing process is a mirror of the epilog collapsing process.

Figure 6:
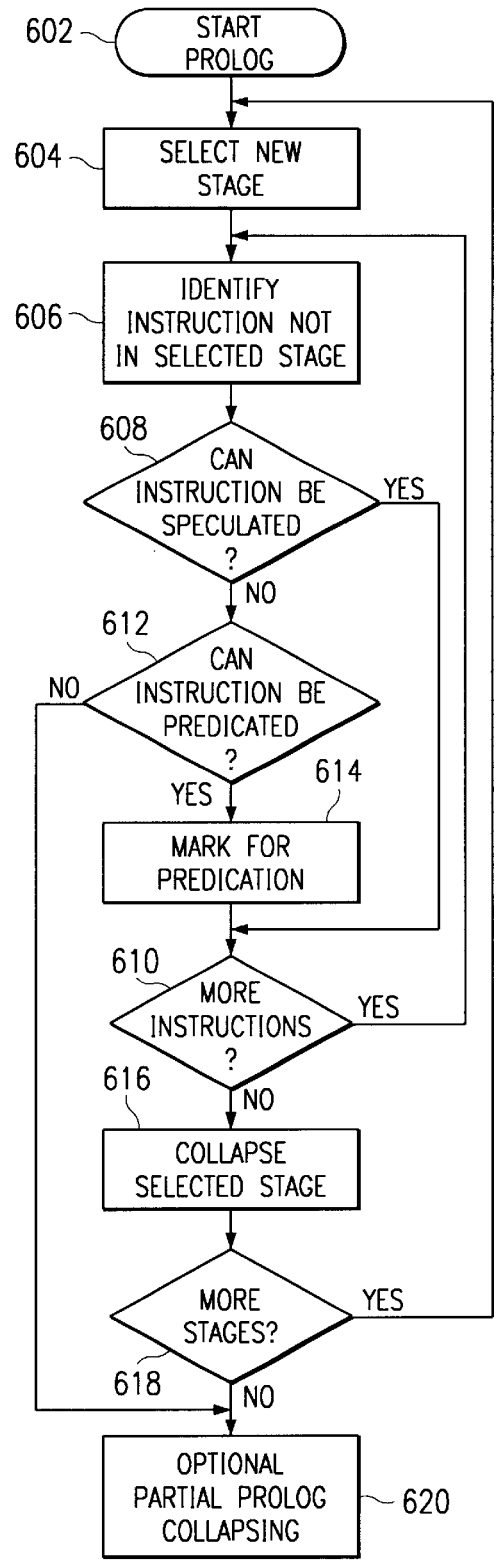
FIG. 6 is a flowchart of a method for reducing code size according to one embodiment of the present invention.

Referring to FIG. 6, a flowchart depicting the method for collapsing the prolog of a software pipelined loop according to one embodiment of the present invention is provided. In step 602, the system evaluates the prolog.

In step 604, the system selects a new stage of the prolog to evaluate. In one embodiment, this stage is the stage that is closest to the kernel (i.e., right before the kernel). Thus, in this embodiment, the system works from the "inside-out," starting with the stage closest to the kernel, and moving outward.

In step 606, the system identifies an instruction in a reference stage that is not in the selected epilog stage. In one embodiment, the reference stage is the kernel. In another embodiment, the reference stage is a previously evaluated stage.

In step 608, the system determines if the identified instruction can be speculated. This step is similar to step 508, above.

If the instruction can be speculated, in step 610 it is determined if there are more instructions that are not in the selected stage. If there are, the system identifies the next instruction in step 606.

If, in step 608, the system determines that the instruction cannot be speculated, in step 612, it determines if the instruction can be predicated. This is similar to step 508, above.

In step 614, the instruction is marked for predication. If the instruction cannot be predicated, then prolog cannot be collapsed further, and the prolog collapse is complete.

In step 618, the system determines if any stages remain in the prolog. If stages remain, in a new stage is evaluated in step 604. If there are no stages remaining, the prolog collapsing is complete.

The stages of the prolog are collapsed in step 616. This may be done when the system determines that there are no more instructions to evaluate in a selected stage, or it may be done after the system determines that the prolog cannot be further collapsed.

In step 620, the system may optionally perform partial prolog collapsing. This will be discussed in greater detail, below.

After completing the collapsing of the epilog and prolog, the system may need to fix any side effects that may have resulted from the speculative execution of any instruction. In another embodiment, the system fixes the side effects after both the epilog and the prolog have been collapsed.

Although the stages of the epilog and prolog were collapsed when their evaluation was complete, in another embodiment, the stages of the epilog are evaluated after all stages in the epilog are collapsed, and the stages of the prolog are collapsed after all stages of the prolog are evaluated. In still another embodiment, the stages of the epilog and prolog are collapsed after all stages of the epilog and prolog are evaluated.

If register allocation has been performed before the epilog/prolog collapsing optimization, in order to improve the success of the collapsing, it may be necessary to reallocate machine registers to simplify dependency constraints that may be created by speculatively executing an instruction.

In another embodiment of the present invention, partial stage prolog collapsing may be performed. Partial stage collapsing may be appropriate when the kernel has more than one cycles. When appropriate, the system can evaluate each cycle in the remaining stage in the prolog before the kernel, attempting to collapse the cycle in the prolog stage into the kernel. The process is similar to the process discussed above.

Figure 7:
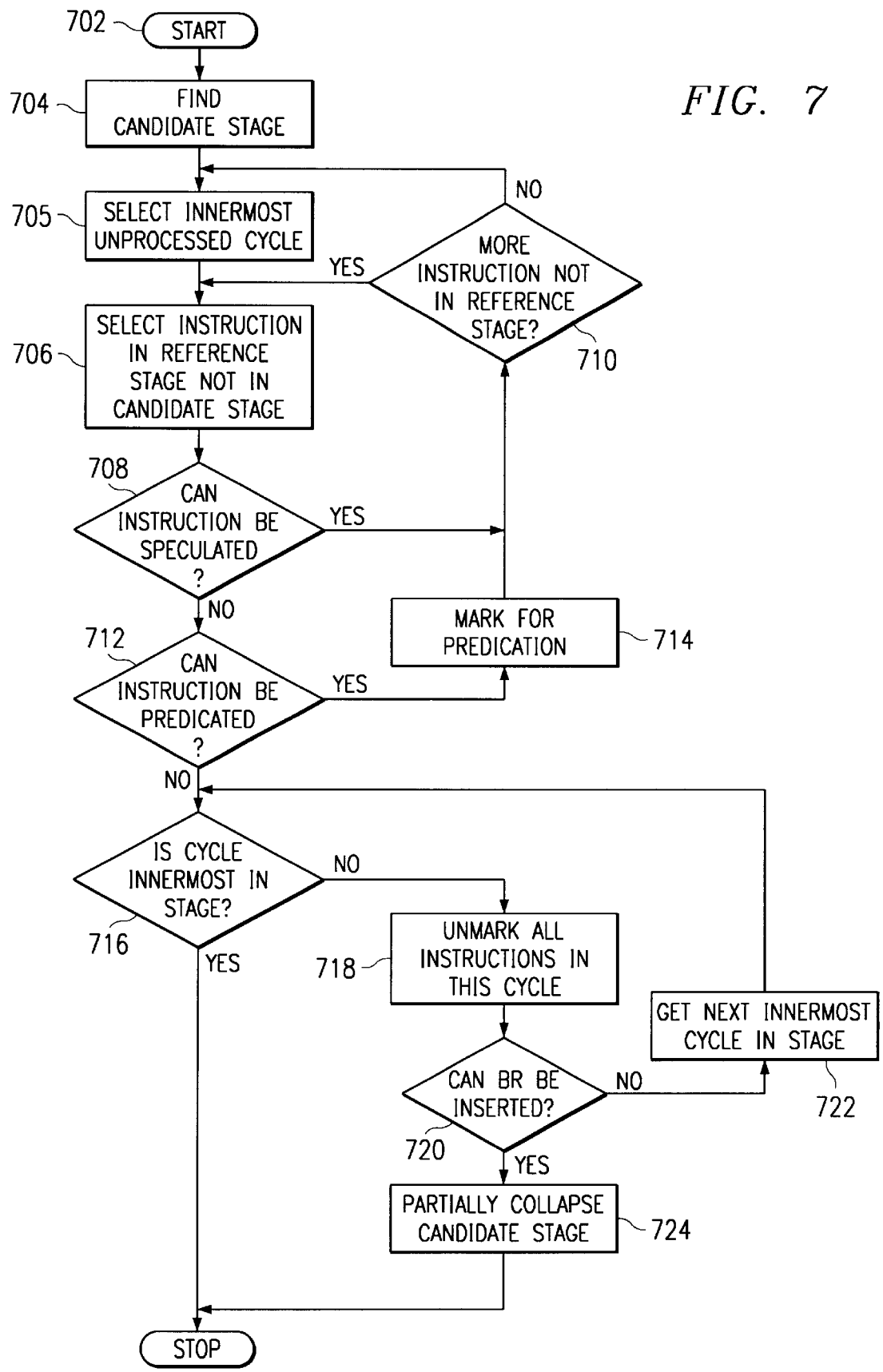
FIG. 7 is a flowchart of a method of partial stage prolog collapsing according to one embodiment of the present invention.

Referring to FIG. 7, a flowchart of the process for partial stage prolog collapsing is provided. In step 702, the system starts evaluating the prolog for partial stage collapsing. This may include determining if partial stage prolog collapsing is feasible.

In particular, after determining which prolog stages can be completely collapsed, the compiler can potentially collapse part of one more stage. In the case where stages are comprised of many cycles, this may be significant.

In step 704, the system identifies the candidate stage, which is the innermost stage that cannot be completely collapsed.

In step 705, the system identifies the innermost cycle of the candidate stage which contains an instruction which can be neither speculated or predicated and is not present in the reference stage. Any preceding stage may serve as the reference stage. In one embodiment, the adjacent stage (i.e., the outermost fully collapsed prolog stage) may be used as the reference stage. Note that it is possible that this may not be the innermost cycle of the candidate stage.

In step 706, the system identifies an instruction which is present in the identified cycle of the candidate stage, but not in the corresponding cycle of the reference stage.

In step 708, the system determines whether the instruction can be speculatively executed. If it can be speculatively executed, the system proceeds to step 710. If not, the system proceeds to step 712.

In step 712, the system checks whether the instruction can be predicated. If it can, the system proceeds to step 714. If not, the system proceeds to step 720.

In step 710, the system has determines if there are any other instructions in this cycle which need processing. In particular, it need only process instructions which are not in the reference cycle. If yes, the system proceeds to step 706. If no, the system proceeds to step 705.

In step 714, the instruction is marked for predication should this cycle be collapsed.

In step 716, the system checks if this cycle is the innermost cycle in this stage. If yes, the system recognizes that the stage cannot be further collapsed. If not, the system proceeds to step 718.

In step 718, the system unmarks all instructions in this cycle. (i.e., undoes effects of step 714 for all marked instructions in this cycle).

In step 720, the system checks whether a branch instruction can be inserted into the code such that the branch would occur immediately before the identified cycle. This is the branch to the corresponding cycle in the kernel. If it can be inserted, the system proceeds to step 724. If no, the system proceeds to step 722.

In step 722, the system selects the next innermost cycle and then proceeds to step 716.

In step 724, the system applies partial prolog collapsing. This includes predicating all remaining instructions marked for predication, if any, and inserting the branch which takes effect just before the current cycle and branches to the corresponding cycle of the kernel. This also includes initializing/adjusting predicates and trip counters as necessary. Then the system completes the process.

After completing the partial stage collapsing of prolog, the system may need to fix side effects that may have resulted from the speculative execution of any instruction.

If register allocation has been performed before the epilog/prolog collapsing optimization, in order to improve the success of the collapsing, it may be necessary to reallocate machine registers to simplify dependency constraints that may be created by speculatively executing an instruction.

EXAMPLES

In order to facilitate a more complete understanding of the invention, a number of Examples are provided below. However, the scope of the invention is not limited to specific embodiments disclosed in the Examples, which are for purposes of illustration only.

Example 1

Collapsing the Epilog

An example of the method described above is provided, using the software pipeline example provided below:

```
loop:    sub orig_trip_count, 2, n   ; n = orig trip count - 2
         ins1                         ; prolog stage 1
         ins2 || ins1 || dec n        ; prolog stage 2
         ;----------------------------------------
kernel:  ins3 || ins2 || ins1 || [n] dec n || [n] br kernel
         ;----------------------------------------
         dec n || ins3 || ins2        ; epilog stage 1
                 dec n || ins3        ; epilog stage 2
```

Starting with the epilog, the system first looks at epilog stage 1 (the epilog stage closest to the kernel) and the kernel, to identify instructions in the kernel that are not in epilog stage 1. In the example above, "ins1" is not in epilog stage 1. Suppose it is determined whether ins1 can be speculatively executed. It is safe to speculate ins1, the loop becomes:

```
loop:    sub orig_trip_count, 1, n   ; n = orig trip count -1
         ins1                         ; prolog stage 1
         ins2 || ins1 || dec n        ; prolog stage 2
         ;----------------------------------------
kernel   ins3 || ins2 || ins1 || [n] dec n || [n] br kernel
         ;----------------------------------------
                 ins 3                ; epilog stage 2
```

Epilog stage 1 has been effectively "rolled back" into the kernel. Consequently, the kernel must be executed one extra time. To do this, the trip counter, n, must be incremented by 1 prior to entering the kernel to account for the extra execution. Once a stage has been collapsed, the minimum number of iterations that will be completely executed (shortest path through loop) is SC-1, which equals two iterations. Although the third iteration is started, only ins1 is actually executed. The process had previously determined that it was safe to execute ins1 an extra time.

Previously, the process needed to know that the trip count was at least 3 to safely execute the loop, the present process now only needs to know that trip count is at least 2. Thus, the required minimum trip count to safely execute the loop has been decreased by 1.

Next, the system moves to epilog stage 2. If epilog stage 2 can be completely removed, the required minimum trip count to safely execute the loop may be reduced by 1, from 3 to 2.

In this case, however, ignoring loop control instructions, there are two instructions which are not executed in the last iteration: ins2 and ins1. Assume that it is determined that ins1 can be safely speculatively executed a second time, but ins2 cannot be safely speculatively executed. Thus, to collapse epilog stage 2, the process must be able to predicate ins2.

Assuming that the conditions for predication, described above, are met, the epilog may be collapsed as shown below:

```
loop:    mv orig_trip_count, n ;      n = orig trip count
         sub n, 1, p           ;      p = n-1
         ;----------------------------------------
         ins1                  ;      prolog stage 1
         ins2 || ins1 || dec n ;      prolog stage 2
         ;----------------------------------------
kernel:  ins3 || [p]ins2 || ins1 || [p]dec p || [n] dec n || [n] br kernel
```

Note that the new predicate register had to be initialized to one less than the trip counter, so that ins2 is not executed on the last iteration.

Besides the obvious code size reduction in the size of the pipelined loop code, there is no need to have two versions of the loop (i.e., pipelined and unpipelined). The pipelined versions suffices.

After the epilog collapsing is complete, the system follows a similar procedure for collapsing the prolog.

Example 2

Partial Prolog Stage Collapsing

In real-world code, the kernel of a software-pipelined loop may be much longer than a single cycle. Typical DSP code for processor families, such as the TMS320C6000 Microprocessor, manufactured by Texas Instruments, Inc., Dallas, Tex., can have loop kernels that are as large as 15 or more cycles. Such large loops represent both a large opportunity and a large obstacle to epilog and prolog collapsing.

In its basic form, collapsing works on entire stages of a software pipeline. The larger a kernel is, the larger each stage of the pipeline. Larger pipeline stages are more likely to contain instructions that cannot be speculated or predicated. They also represent a granularity problem, since larger kernels tend to have fewer epilog and prolog stages to collapse.

As discussed above, an extension to prolog collapsing, known as partial-stage prolog collapsing, allows collapsing at a finer granularity than a stage. In particular, one or more cycles of a stage of a prolog can be collapsed, even if the entire stage cannot. This is especially effective on larger loops which typically have larger stages and smaller numbers of stages.

For example, the following code segment is considered. loop:

```
loop:
         ;----------------------------------------
         ins1                           ; Stage 1, Cycle 1 of prolog
         ins2                           ; Stage 1, Cycle 2 of prolog
         ins3                           ; Stage 1, Cycle 3 of prolog
         ins4 || ins1                   ; Stage 2, Cycle 1 of prolog
         ins5 || ins2                   ; Stage 2, Cycle 2 of prolog
         ins6 || ins3                   ; Stage 2, Cycle 3 of prolog
         ;----------------------------------------
kernel:  ins7 || ins4 || ins1                    ; Cycle 1
         ins8 || ins5 || ins2 || [n] dec n       ; Cycle 2
         ins9 || ins6 || ins3 || [n] br kernel   ; Cycle 3
         ;----------------------------------------
```

In this case, the kernel is 3 cycles long with 3 parallel iterations. Suppose ins7 can neither be speculated nor predicated. Suppose all other instructions may be safely speculated in the prolog and that the epilog has already been entirely collapsed. Because ins7 can neither be speculated nor predicated, it is not possible to collapse a single full stage of the prolog. This is unfortunate, because most of the code expansion due to the prolog is in the stage that would be collapsed first.

Partial-stage prolog collapsing works by branching into the middle of the kernel, bypassing instructions which could not be speculated. In this case, ins7 must be bypassed. If this can be accomplished, cycles 2 and 3 of stage 2 of the prolog can be collapsed with this technique as shown below:

```
loop:
        add n, 1, n              ; Execute the kernel n+1 times
;------------------------------------------------------------
        ins1                     ; Stage 1, Cycle 1 of prolog
        ins2                     ; Stage 1, Cycle 2 of prolog
        ins3                     ; Stage 1, Cycle 3 of prolog
        ins4 || ins1 || br k2    ; Stage 2, Cycle 1 of prolog
;------------------------------------------------------------
kernel: ins7 || ins4 || ins1               ; Cycle 1
k2:     ins8 || ins5 || ins2 || [n] dec n  ; Cycle 2
        ins9 || ins6 || ins3 || [n] br kernel ;
;------------------------------------------------------------
        Cycle 3
;------------------------------------------------------------
```

Thus, it can be seen that, although the entire stage could not be collapsed, partial stage collapsing results in a reduction in code size.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims departing from the scope claimed below.

What is claimed is:

1. A method for reducing a code size of a software pipelined loop having a kernel and an epilog, comprising:
   evaluating at least one stage of the epilog, comprising:
   selecting a stage of the epilog to evaluate;
   evaluating at least one instruction in a reference stage, comprising
       identifying an instruction in the reference stage that is not present in the selected stage of the epilog;
       determining if the identified instruction can be speculated;
       noting that the identified instruction can be speculated responsive to a determination that the identified instruction can be speculated;
       determining if the identified instruction can be predicated responsive to a determination that the identified instruction cannot be speculated;
       marking the identified instruction as needing predication responsive to a determination that the identified instruction can be predicated;
   determining if another instruction in the reference stage is not present in the selected stage of the epilog;
   repeating the instruction evaluation responsive to a determination that there is another instruction in the reference stage not present in the selected stage of the epilog;
   determining if there is another stage of the epilog to evaluate;
   repeating the evaluation of the stage responsive to a determination that there is another instruction in the reference stage not present in the selected stage of the epilog; and collapsing the selected stage of the epilog responsive to a determination that there is not another instruction in the reference stage not present in the selected stage of the epilog.

2. The method of claim 1, wherein the reference stage is the kernel.

3. The method of claim 1, wherein the reference stage is a previously evaluated stage.

4. The method of claim 1, further comprising:
   speculating the instructions noted as capable of being speculated; and
   predicating the instructions marked as being capable of being predicated.

5. A method for reducing a code size of a software pipelined loop having a prolog and a kernel, comprising:
   evaluating at least one stage of the prolog, comprising:
   selecting a stage of the prolog to evaluate;
   evaluating at least one instruction in a reference stage, comprising
       identifying an instruction in the reference stage that is not present in the selected stage of the prolog;
       determining if the identified instruction can be speculated;
       noting that the identified instruction can be speculated responsive to a determination that the identified instruction can be speculated;
       determining if the identified instruction can be predicated responsive to a determination that the identified instruction cannot be speculated;
       marking the identified instruction as needing predication responsive to a determination that the identified instruction can be predicated;
   determining if another instruction in the reference stage is not present in the selected stage of the prolog;
   repeating the instruction evaluation responsive to a determination that there is another instruction in the reference stage not present in the selected stage of the prolog;
   determining if there is another stage of the prolog to evaluate; and
   repeating the evaluation of the stage responsive to a determination that there is another instruction in the reference stage not present in the selected stage of the prolog; and collapsing the selected stage of the prolog responsive to a determination that there is not another instruction in the reference stage not present in the selected stage of the prolog.

6. The method of claim 5 wherein the reference stage is the kernel.

7. The method of claim 5 wherein the reference stage is a previously evaluated stage.

8. The method of claim 5, further comprising:
   speculating the instructions noted as capable of being speculated; and
   predicating the instructions marked as being capable of being predicated.

9. A method for reducing a code size of a software pipelined loop having a prolog and a kernel, said kernel having a plurality of cycles, comprising:

evaluating at least one stage of the prolog, comprising:
  selecting a candidate stage of the prolog to evaluate;
  evaluating at least one cycle of the prolog, comprising:
    selecting an innermost unprocessed cycle of the selected stage to evaluate, comprising:
      evaluating at least one instruction in a reference stage, comprising
        identifying an instruction in a cycle of the reference stage that is not present in a corresponding cycle of the candidate stage;
        determining if the identified instruction can be speculated;
        noting that the identified instruction can be speculated responsive to a determination that the identified instruction can be speculated;
        determining if the identified instruction can be predicated responsive to a determination that the identified instruction cannot be speculated;
        marking the identified instruction as predicated responsive to a determination that the identified instruction can be predicated;
      determining if another instruction in the reference stage is not present in the selected cycle of the prolog;
      repeating the instruction evaluation responsive to a determination that there is another instruction in the reference stage not present in the corresponding cycle of the prolog;
    determining if there is another cycle of the candidate stage of the prolog to evaluate;
    repeating the cycle evaluation responsive to a determination that there is another cycle to evaluate;
  determining if there is another stage of the prolog to evaluate; and
  repeating the evaluation of the stage responsive to a determination that there is another stage of the prolog to evaluate;
  determining if the selected innermost unprocessed cycle is the innermost cycle of the candidate stage;
unmarking all marked instructions in the selected innermost unprocessed cycle responsive to a determination that the selected innermost unprocessed cycle is not the innermost cycle of the candidate state;
determining if a branch can be inserted so that it occurs before the selected innermost unprocessed cycle;
partially collapsing the candidate stage responsive to a determination of whether the selected innermost unprocessed cycle is the innermost cycle of the candidate stage responsive to a determination that the selected innermost unprocessed cycle is not the innermost cycle for the candidate stage.

10. The method of claim 9 wherein the reference stage is the kernel.

11. The method of claim 9 wherein the reference stage is a previously evaluated stage.

12. The method of claim 9, further comprising:
  speculating the instructions noted as capable of being speculated; and
  predicating the instructions marked for predication.

* * * * *